(12) United States Patent
Tremblay et al.

(10) Patent No.: US 6,660,166 B2
(45) Date of Patent: Dec. 9, 2003

(54) REMOVAL OF HORMONES FROM LIQUIDS

(75) Inventors: Mario Elmen Tremblay, West Chester, OH (US); Dimitris Ioannis Collias, Mason, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 09/736,749

(22) Filed: Dec. 14, 2000

(65) Prior Publication Data

US 2002/0074294 A1 Jun. 20, 2002

Related U.S. Application Data

(60) Provisional application No. 60/172,488, filed on Dec. 17, 1999.

(51) Int. Cl.[7] .............................................. B01D 15/00
(52) U.S. Cl. ....................................... 210/694; 210/908
(58) Field of Search ............................... 210/694, 483, 210/502.1, 541, 908, 679

(56) References Cited

U.S. PATENT DOCUMENTS 4,639,513 A * 1/1987 Hou et al. ................... 530/387
4,944,884 A * 7/1990 Naoi ........................... 210/694
5,427,683 A   6/1995 Gershon et al. ............. 210/264
5,904,854 A * 5/1999 Shmidt et al. ............... 210/694

FOREIGN PATENT DOCUMENTS

| DE | 43 27 598 A1 | 2/1995 |
| JP | 08 164202 A | 6/1996 |
| WO | WO 00/04977 A2 | 2/2000 |
| WO | WO 00/71467 A1 | 11/2000 |

OTHER PUBLICATIONS

T.J. Ridgway, et al., "Removal of oestrogens and oestrogen mimics from the environment", *Xenobiotic Pollution and Recovery by Natural Systems*, 1998, 675–680, vol. 26, Biochemical Society Transactions.

* cited by examiner

*Primary Examiner*—Ivars Cintins
(74) *Attorney, Agent, or Firm*—T. P. Cummings; C. J. Roof; J. C. Vago

(57) ABSTRACT

Disclosed is a method of removing hormone(s) from a liquid, the method comprising contacting the liquid with a filter comprising activated carbon fibers. Also disclosed is an article of manufacture comprising (i) a filter comprising activated carbon fibers and (ii) instructions informing a user that the filter is capable of removing hormone(s) from I.

36 Claims, 1 Drawing Sheet

REMOVAL OF HORMONES FROM LIQUIDS

CROSS REFERENCE

This application claims priority under Title 35, United States Code 119(e) from Provisional Applications Ser. No. 60/172,488, filed Dec. 17, 1999.

TECHNICAL FIELD

The present invention relates to a method for removing hormones from liquids by filtration. In particular, it relates to such a method that comprises the use of activated carbon fibers for removing hormones from liquids.

BACKGROUND OF THE INVENTION

Water may contain many different kinds of contaminants including, for example, harmful chemicals. In a variety of circumstances, these contaminants should be removed before the water can be used, for example before the water becomes potable. Hormones are one example of a potentially harmful contaminant that are found in drinking water. In particular, estrogens are a class of hormones and part of a group of chemicals called endocrine disrupters. Estrogens, which may come from plant-derived foods, natural excretion of mammalian females or from birth-control pills, can be discharged from sewage treatment plants, and thus be introduced into the main water supply. These estrogens have been shown to have hormone-disrupting effects on males (both human and animal). Furthermore, estrogens have been linked with declining sperm counts in the human male population and with an increased incidence of testicular, breast and prostate cancer. Research shows that sperm count in Europe fell by 3.1 million per milliliter per year from 1971 to 1990. Testicular cancer rose in England by 55% between 1979 and 1991 with 1,337 cases in 1991. Diagnosed cases of prostate cancer rose in England by 40% over the same period. See the web site for Friends of the Earth (FOE), at http://www.foe. co.uk/fund/welcome/about_foe.html. FOE is in the process of working with companies that currently discharge estrogens into their effluent streams to investigate ways of removing estrogen-type substances from those effluent streams. See Id. For a general discussion of the potential negative health effects resulting from the release of hormones into water sources, see Ridgeway, T. J. and Wiseman, H., "Removal of oestrogen and oestrogen mimics from the environment", *Biochemical Society Transaction* ($666^{th}$ Meeting of the Biochemical Society in Sheffield, England), Vol. 24(4), p 675–680 (November 1998).

To date, a filter capable of effectively removing hormones and in particular estrogens from water is not available. Applicants have surprisingly discovered that a filter comprising activated carbon fibers completely removes hormones from water.

Accordingly, an object of the present invention is to provide a method for effectively removing hormones from a liquid source, wherein the method involves the use of a filter comprising activated carbon fibers. The effective removal of hormones using such a filter has not previously been demonstrated by the prior art. The filter used will preferably present a low resistance to the flow of liquid through the apparatus, and will remove the hormone from a substantial volume of liquid before becoming saturated.

SUMMARY OF THE INVENTION

The present invention relates to a method of removing hormones from a liquid, the method comprising contacting the liquid with a filter including activated carbon fibers. The invention also relates to an article of manufacture comprising (i) a filter including activated carbon fibers and (ii) instructions informing a user that the filter is capable of removing hormones from liquid.

DETAILED DESCRIPTION OF THE PRESENT INVENTION

I. Definitions

Figure 1:
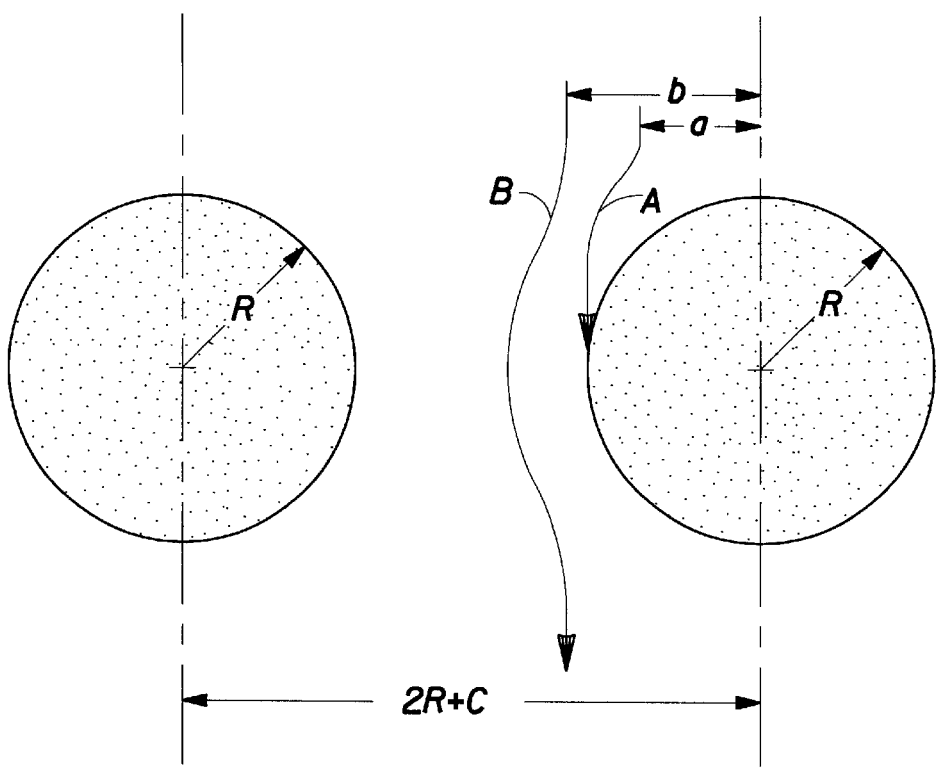
FIG. 1 is a cross sectional view of two activated carbon fibers. Also depicted are the respective paths taken by two estrogen molecules.

As used herein, an "activated carbon fiber" ("ACF") means activated carbon in a form having a relatively high aspect ratio, i.e., ratio of length to diameter. For purposes of the present discussion an individual activated carbon fiber will have an aspect ratio of at least about 2. ACFs useful herein are more fully described below.

As used herein, the term "estrogen" refers to any substance, natural or synthetic, that exerts biological effects characteristic of estrogenic hormones, such as estradiol and equivalents thereof. Examples of estrogen hormones are $17\beta$-estradiol, $\alpha$-estradiol, conjugated estrogens, esterified estrogens, micronized estradiol, sodium estrogen sulfate, ethinyl estradiol, estrone, and other estrogenic steroids and derivatives and esters thereof are representative of estrogens. Representative esters include estradiol-3,17-diacetate, estradiol-3-acetate, estradiol-17-acetate, estradiol-3,17-divalerate, estradiol-3-valerate, estradiol-17-valerate. Use of the term "estrogen" refers to hormones in general, unless otherwise specified.

As used herein, a "filter" is any article of manufacture containing the activated carbon fibers to enable their function in removing hormones from liquid. Such a filter may be as simple as the fibers and a structure for retaining the fibers. It is apparent that such an enclosure must be capable of preventing loss of fibers during operation, as well as maintaining the desired inter-fiber network during use. Various representative embodiments for the filter of the present invention are described below.

As used herein, the terms "filters" and "filtration" refer to hormone removal via adsorption.

As used herein, the term "hormone" refers to a chemical substance, released from a living cell into the extracellular fluid in low quantities, which acts on a target cell to produce a response. Hormones are classified on the basis of chemical structure; most hormones are polypeptides, steroids or derived from a single amino acid (Kirk-Othmer "Concise Encyclopedia of Chemical Technology", John Wiley & Sons, Inc., 4th Edition (1999), p. 1055). Steroid hormones include estrogens, androgens (e.g., testosterone and derivatives thereof), corticoids and progestins. The method of the present invention is preferably directed to removing steroid hormones, particularly the estrogens, from a liquid (preferably water).

As used herein, unless otherwise indicated, the term "water" is intended to refer to liquids in general.

II. Activated Carbon Fibers

Activated carbon fibers can be characterized by their length, diameter, porosity, specific surface area, and elemental composition. Length is meant to describe the distance from end to end of a fiber. The diameter refers to the mean diameter of a fiber. Porosity is characterized by the mean pore size of the fiber. Specific surface area is a measure of the fiber surface, including the area within the pores, per unit of mass of fiber. For the present invention, activated carbon fibers will preferably have: specific surface areas in a range of from about 100 to about 4000 m$^2$/g, more preferably from about 500 to about 3000 m$^2$/g, still more preferably about 1200 to about 2000 m$^2$/g; diameters in a range of from about 5 to about 50 $\mu$m, more preferably about 10 to about 25 $\mu$m, still more preferably about 15 to about 20 $\mu$m; pore sizes from about 2.5 Å to about 300 nm, more preferably from about 5 Å to about 200 nm, still more preferably from about 10 Å to about 100 nm, and fiber lengths from about 10 $\mu$m to continuous, more preferably from about 200 $\mu$m to about 10 mm, still more preferably from about 1 mm to about 6 mm. Preferred ACFs will have an aspect ratio of at least about 5 and preferably from about 10 to about 2000, more preferably from about 10 to about 500. The carbon fibers can be solid or hollow. Activated carbon fibers have a narrow, sub-micron range of surface features not found in other activated carbon forms such as granules, pellets, or other irregular shapes impregnated with carbon.

The manufacture of activated carbon fibers is described thoroughly in the literature and such fibers are available commercially from several sources. In general, carbonized fibers are made by carbonizing polyacrylonitrile (PAN), phenol resin, pitch, cellulose fiber or other fibrous carbon surfaces in an inert atmosphere. The raw materials from which the starting fibers are formed are varied, and include pitch prepared from residual oil from crude oil distillation, residual oil from naphtha cracking, ethylene bottom oil, liquefied coal oil or coal tar by treatment such as filtration purification, distillation, hydrogenation or catalytic cracking. The starting fibers may be formed by various methods, including melt spinning and melt blowing. Carbonization and activation provide fibers having higher surface areas. For example, activated carbon fibers are commercially available from Anshan East Asia Carbon Fibers Co., Ltd. (Anshan, China) as Carboflex® (petroleum-based), and Osaka Gas Chemicals Co., Ltd. (Osaka, Japan) as Renoves A® series-AD'ALL (coal tar-based). Anshan's Carboflex® activated carbon fibers are 20 $\mu$m in diameter with a specific surface area of about 1,000 m$^2$/g. They come in various lengths ranging from 200 $\mu$m to a continuous filament. Osaka Gas Chemicals' Renoves A® series-AD'ALL activated carbon fibers are 18 $\mu$m in diameter with various specific surface areas ranging from 1,000 to 2,500 m$^2$/g. They also come in various lengths varying from 700 $\mu$m to a continuous filament.

III. Filters

A. Structures

Bulk density is commonly used in the art to describe carbon-containing structures. The filters of the present invention will have a bulk density of from about 0.15 to about 0.8 g/cm$^3$, preferably from about 0.16 to about 0.6 g/cm$^3$, still more preferably about 0.2 to about 0.4 g/cm$^3$. In having calculated the bulk density and knowing the dimensions of the activated carbon fiber, one can determine the average interstitial spacing between fibers. It is discovered that interstitial spacing between fibers (also called inter-fiber spacing) is the critical parameter that controls the removal of hormones. Optimal interstitial spacing is achieved when the activated carbon fibers are compressed along the longitudinal or flow axis of the filter.

While not wishing to be bound by theory, it is believed that the surprising ability of the present filters to remove hormones is due to inter-fiber spacing that results from the packing of the activated carbon fibers. It is believed that the attachment of hormone onto activated carbon fibers is governed by electrostatic, van der Waals, and hydrophobic forces. These forces have different signs, or equivalently, some of them are attractive and some repulsive. For example, the electrostatic forces are typically repulsive since most of the surfaces are negatively charged (except for modified surfaces as well as some unmodified clay structures and asbestos). On the other hand, van der Waals and hydrophobic forces are typically attractive. The net effect of all these forces is typically a minimum in the interaction energy, called secondary minimum, that causes microorganisms to attach to surfaces. In terms of interaction distances, electrostatic forces have a characteristic distance of about 50 nm, whereas van der Waals forces have a characteristic distance of about 100 nm.

In terms of the mechanics of the flow of hormones in the filter, it is believed that the distance between two adjacent fibers, c, is critical in achieving attachment of hormone to the fibers (see FIG. 1). In general, hormones might flow close to the surface of a fiber so that the overall attractive force would cause them to attach to the surface (see hormone A in FIG. 1). On the other hand, hormones might flow far away from the fiber surface so that the overall attractive force cannot "pull" them towards the fiber surface for attachment (see hormone B in FIG. 1).

In terms of the effect of the inter-fiber distance (also called spacing) on hormone attachment onto the fiber surfaces, it is believed that there is an optimum range of inter-fiber distances that is necessary for hormone attachment to fibers and removal from water. When this inter-fiber distance, c (see FIG. 1), is relatively large, then the majority of hormones do not come close to the fiber surface for the forces mentioned above to cause attachment to the surfaces. As a result, the majority of hormones do not get removed from the incoming liquid, and thus behave as hormone B in FIG. 1. On the other hand, when this inter-fiber distance is relatively small, then the majority of hormones come close to the surface of the fibers and experiences the forces mentioned above. However, the shear conditions at these small gaps are high, and it is expected that the shear forces are high enough to overcome the attractive forces between hormone and carbon surfaces. In these conditions there might be some hormones that behave like hormones A in FIG. 1 that do get attached to the fibers. However, it is expected that due to high shear forces these hormones might experience dislodging at some later point in time. As a result, the majority of hormones do not get removed from the incoming water. Therefore, there is an optimum range of inter-fiber spacing that strikes a balance between shear forces, attractive and repulsive forces. This balance ensures that hormones get removed during their flow in the carbon fiber filters.

One process for building an activated carbon fiber filter capable of removing all hormones from a liquid comprises placing activated carbon fibers into a hollow cylinder and applying linear force along the axis of the cylinder, thus compressing the fibers. It is to be understood that the liquid to be treated will be flowed along the axis of the cylinder which is also the axis of compression. The axial compression described is but one means of compressing fibers and other means of compression include, but are not limited to, hydraulic pressure across a membrane, opposed knuckles on a roller pressing against the fibers placed in a hollow form, a levered pressing element, or a hydraulic press. It is to be further understood that the cylinder could as well be any other shape, such as box or cone, which lends itself to axial compression of the fibers. Optionally, where the fibers are not compressed into the final structure housing, they may be bound by an adhesive means. Additionally, the activated carbon fibers can be shaped into an annular shape to take advantage of radial liquid flow.

Further, and optionally, the carbon fibers may be selected from a range of diameters so that when placed together, the interstitial spacing between the first, and larger, diameter fibers will closely conform to the second, and smaller, diameter fibers, and so that successively smaller diameter fibers will closely conform with the remaining interstitial space between the various selected larger fibers. By the selection of fiber diameters and lengths the size, form, and surface area of the interstitial space can be substantially controlled and made uniform at a smaller scale than would be possible if a single fiber diameter is used. Additionally, the activated carbon fibers may be combined with other materials, of different shapes, to control interstitial spacing. Such materials may be carbonaceous or non-carbonaceous.

Figure 2:
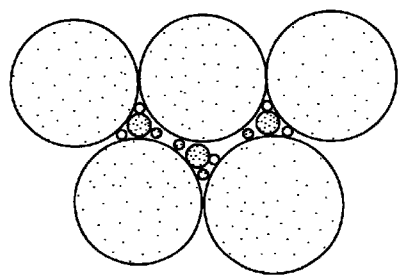
FIG. 2 is a cross sectional view of a plurality of activated carbon fibers. The fibers have varying diameters.

In one embodiment illustrated in FIG. 2, the activated carbon filter may be comprised of aligned larger fibers compressed with a plurality of smaller fibers so that the smaller fibers fill in the interstitial space between the large fibers, thereby forming successively smaller and parallel interstitial spaces along the axis of the fibers and continuous in the axial fiber direction through the entire structure. In this embodiment it can be seen that the size of the interstitial spaces created are much smaller than the fiber members, they are uniform through the structure and can readily be controlled by the diameter of the fibers selected.

B. Hormone Removal

The filters useful in the methods of the present invention comprise activated carbon fibers, and are capable of effectively removing hormone from a water source. The use of such filters therefore obviously would improve the health risk situation in many drinking water sources where hormone is present. For example, the ability to remove hormone at such a high level for such a long period of usage (i.e., before they reach failure because of saturation) allows purification of water, in terms of making the water potable without undue health risk.

With respect to removal of hormones, the methods of the present invention will remove at least about 90% of hormones contained in the liquid in question. Preferably, at least 99%, more preferably at least about 99.9%, of the hormones will be removed from the liquid. A test method for determining a given filter's ability to remove hormone from a fluid is set forth in the Test Method section below.

Applicants have found that when test fluid in the form of distilled water containing hormone at known concentration is flowed through a filter described herein at a known flow rate for a given period of time, the filtration has yielded complete hormone removal (i.e., to detection limits of the method).

IV. Articles of Manufacture

The articles of manufacture of the present invention comprise the filter and information that will inform the consumer, by written or spoken words and/or by pictures, that use of the filter will provide water filtration benefits which include removal of hormones, particularly estrogens, and this information may include the claim of superiority over other filter products in this regard. In a highly desirable variation, the article of manufacture bears the information that communicates that the use of the filter provides reduced levels of hormones, including estrogens. Accordingly, the use of packages in association with information that will inform the consumer, by words and/or by pictures, that use of the filter will provide benefits such as improved reduction of water contaminants as discussed herein, is important. The information can include, e.g., advertising in all of the usual media, as well as statements and icons on the package, or the filter itself, to inform the consumer of the unique hormone removal capabilities. The information may be communicated only by verbal means, only by written means, or both. Obviously, the information need not be included directly with the product to constitute an article within this aspect of the invention. That is, for example, if a filter is sold and advertisements are communicated generally about the filter, this would constitute an article of this invention.

V. Test Method

Ten liters of distilled water containing 100 nM 17β-estradiol (non-radioactive from Sigma Inc., Milwaukee, Wis.; Catalog # E8875 & Lot # 77H0666) and 10 $\mu$Ci (~20,000,000 disintegration per minute (dpm)) of tritiated 17β-estradiol (radioactive from Life Science Products, Inc., Boston, Mass.; Catalog # NET317 & Lot # 3329349) are passed through the test filter at a flow rate of 1 liter per minute. The background counts, C, using distilled water are determined to serve as a control. The counts of the influent water containing the labeled estradiol are measured, the control counts C are subtracted and the difference is reported as X dpm. One ml samples of effluent are taken every liter of throughput. Fifteen ml of Ultra Gold High Flash point scintillation cocktail (Packard Instrument Co., Meriden, Conn.) is added to each effluent sample and the samples are counted using a Packard Tri Carb 2500 TR liquid Scintillation analyzer (Packard Instrument). The counts of the effluent samples are measured, the control counts C are subtracted and the difference is reported as $Y_v$ dpm, where v is the volume, in liters, of water that has flowed at the time of sampling. The percentage removal of hormone for each sample is calculated as $[(X-Y_v)/X] \times 100$.

VI. EXAMPLE

ACF is packed for use as a filter media utilizing stainless steel cylindrical holders available from Robert James Sales, Inc. (Cincinnati, Ohio) as part # PR1216. These holders have an internal diameter of 5 cm. The stainless steel holders are cleaned with dish washing detergent (e.g., Dawn®), bleach (e.g., Clorox®) and diluted with tap water (e.g., 5:1000 dilution). The holders are rinsed with warm tap water, and then rinsed again with isopropyl alcohol. The holders are air dried for 3 hours and then assembled and packed according to the following procedure.

An effluent end cap and gasket are clamped onto the stainless steel holders. An O-ring, a spacer, and a one-inch diameter 80 mesh stainless steel screen is placed into the bottom of the tube. Eighty five grams of Anshan's Carboflex® P3200 pitch-based activated carbon fiber are added to the holder. An O-ring, a stainless steel 80 mesh screen and spacer are inserted in order on top of the ACF in the cylinder. A gasket is placed on top of the holder. An influent piston/screw end cap, with O-rings added to the piston, is inserted into the top of the holder and clamped on using a sanitary fitting clamp. A 15.2 cm target bed depth of ACF material is achieved by adjusting the piston position using a socket wrench. The resulting bed volume is 309 cm³.

Ten liters of distilled water containing 100 nM 17β-estradiol (non-radioactive from Sigma Inc., Milwaukee, Wis.; Catalog # E8875 & Lot # 77H0666) and 10 $\mu$Ci (~20,000,000 disintegration per minute (dpm)) of tritiated 17β-estradiol (radioactive from Life Science Products, Inc., Boston, Mass.; Catalog # NET317 & Lot # 3329349) are passed through the filter at a flow rate of 1 liter per minute. Note that the concentration of the 17β-estradiol is about 200 times the highest level recorded in the effluent of sewage treatment plants. Furthermore, the background counts of the distilled water (i.e., control sample) used are 22 dpm. The counts of the influent water containing the estradiol are measured as 1700 dpm. One ml samples are taken every liter of throughput. Fifteen ml of Ultra Gold High Flash point scintillation cocktail (Packard Instrument Co., Meriden, Conn.) are added to each sample and counted using a Packard Tri Carb 2500 TR liquid Scintillation analyzer (Packard Instrument, Meriden, Conn.). The counts of the effluent water (consistently in all samples) were not significantly different than those of the control samples. Therefore, it is concluded that the filter completely removes the 17β-estradiol.

What is claimed is:

1. A method for removing hormone(s) from a liquid, the method comprising contacting the liquid with a filter comprising activated carbon fibers, said filter having a bulk density of from about 0.15 g/cm$^3$ to about 0.8 g/cm$^3$, and said activated carbon fibers having diameters of from about 5 μm to about 50 μm and fiber lengths of from about 10 μm to about 10 mm, wherein said activated carbon fibers have an inter-fiber spacing whereby the filter removes at least about 90% of the hormone(s) at a flow rate of 1 liter per minute with a total influent volume often liters at a hormone concentration of 100 nM.

2. The method of claim 1 wherein the filter removes at least about 99% of the hormone(s) at a flow rate of 1 liter per minute with a total influent volume of ten liters at a hormone concentration of 100 nM.

3. The method of claim 2 wherein the filter removes at least about 99.9% of the hormone(s) at a flow rate of 1 liter per minute with a total influent volume often liters at a hormone concentration of 100 nM.

4. The method of claim 1 wherein said filter has a bulk density of from about 0.16 g/cm$^3$ to about 0.6 g/cm$^3$, and said activated carbon fibers have diameters of from about 10 μm to about 25 μm and fiber lengths of from about 200 μm to 10 mm.

5. The method of claim 4 wherein said filter has a bulk density of from about 0.2 g/cm$^3$ to about 0.4 g/cm$^3$, and said activated carbon fibers have diameters of from about 15 μm to about 20 μm and fiber lengths of from about 1 mm to about 6 mm.

6. The method of claim 1 wherein said activated carbon fibers have surface areas of from about 100 m$^2$/g to about 4000 m$^2$/g, pore sizes from about 2.5 Å to about 300 nm, and aspect ratios of at least about 5.

7. The method of claim 6 wherein said activated carbon fibers have surface areas of from about 500 m$^2$/g to about 3000 m$^2$/g, pore sizes from about 5 Å to about 200 nm, and aspect ratios of from about 10 to about 2000.

8. The method of claim 7 wherein said activated carbon fibers have surface areas of from about 1200 m$^2$/g to about 2000 m$^2$/g, pore sizes from about 10 Å to about 100 nm, and aspect ratios of from about 10 to about 500.

9. The method of claim 1 wherein said filter comprises activated carbon fibers having a mass of from about 62 g to about 124 g.

10. The method of claim 1 wherein said filter comprises activated carbon fibers having different mean diameters.

11. The method of claim 1 wherein said filter comprises a mixture of activated carbon fibers and non-carbonaceous materials.

12. A method for removing hormone(s) from a liquid, the method comprising contacting the liquid with a filter comprising activated carbon fibers, wherein said activated carbon fibers have an inter-fiber spacing whereby said filter has a bulk density of from about 0.15 g/cm$^3$ to about 0.8 g/cm$^3$, and said activated carbon fibers have diameters of from about 5 μm to about 50 μm and fiber lengths of from about 10 μm to about 10 mm.

13. The method of claim 12 wherein said filter has a bulk density of from about 0.16 g/cm$^3$ to about 0.6 g/cm$^3$, and said activated carbon fibers have diameters of from about 10 μm to about 25 μm and fiber lengths of from about 200 μm to 10 mm.

14. The method of claim 13 wherein said filter has a bulk density of from about 0.2 g/cm$^3$ to about 0.4 g/cm$^3$, and said activated carbon fibers have diameters of from about 15 μm to about 20 μm and fiber lengths of from about 1 mm to 6 mm.

15. The method of claim 12 wherein said activated carbon fibers have surface areas of from about 100 m$^2$/g to about 4000 m$^2$/g, pore sizes from about 2.5 Å to about 300 nm, and aspect ratios of at least about 5.

16. The method of claim 15 wherein said activated carbon fibers have surface areas of from about 500 m$^2$/g to about 3000 m$^2$/g, pore sizes from about 5 Å to about 200 nm, and aspect ratios of from about 10 to about 2000.

17. The method of claim 16 wherein said activated carbon fibers have surface areas of from about 1200 m$^2$/g to about 2000 m$^2$/g, pore sizes from about 10 Å to about 100 nm, and aspect ratios of from about 10 to about 500.

18. The method of claim 12 wherein said activated carbon fibers have a mass of from about 62 g to about 124 g.

19. The method of claim 12 wherein said filter comprises activated carbon fibers having different mean diameters.

20. The method of claim 12 wherein said filter comprises a mixture of activated carbon fibers and non-carbonaceous materials.

21. A method for removing hormone(s) from a liquid, the method comprising contacting the liquid with a filter comprising activated carbon fibers, wherein said activated carbon fibers have an inter-fiber spacing whereby the filter removes at least about 90% of the hormone(s) at a hormone concentration of 100 nM and with said activated carbon fibers having a mass of from about 62 g to about 124 g.

22. The method of claim 21 in said filter removes at least about 99% of the hormone(s) at a hormone concentration of 100 nM and with said activated carbon fibers having a mass of from about 62 g to about 124 g.

23. The method of claim 22 wherein said filter removes at least about 99.9% of the hormone(s) at a hormone concentration of 100 nM and with said activated carbon fibers having a mass of from about 62 g to about 124 g.

24. The method of claim 21 wherein said filter removes hormone(s) at a flow rate of 1 liter per minute.

25. The method of claim 21 wherein said filter has a bulk density of from about 0.2 to about 0.4 g/cm$^3$.

26. The method of claim 21 wherein said filter comprises activated carbon fibers having different mean diameters.

27. The method of claim 21 wherein said filter comprises a mixture of activated carbon fibers and non-carbonaceous materials.

28. A method for removing hormone(s) from a liquid, the method comprising contacting the liquid with a filter consisting essentially of activated carbon fibers, wherein said activated carbon fibers have an inter-fiber spacing whereby said filter has a bulk density of from about 0.15 g/cm$^3$ to about 0.8 g/cm$^3$, and said activated carbon fibers have diameters of from about 5 μm to about 50 μm and fiber lengths of from about 10 μm to about 10 mm.

29. The method of claim 28 wherein said filter has a bulk density of from about 0.16 g/cm$^3$ to about 0.6 g/cm$^3$, and said activated carbon fibers have diameters of from about 10 $\mu$m to about 25 $\mu$m and fiber lengths of from about 200 $\mu$m to about 10 mm.

30. The method of claim 29 wherein said filter has a bulk density of from about 0.2 g/cm$^3$ to about 0.4 g/cm$^3$, and said activated carbon fibers have diameters of from about 15 $\mu$m to about 20 $\mu$m and fiber lengths of from about 1 mm to about 6 mm.

31. The method of claim 28 wherein said activated carbon fibers have surface areas of from about 100 m$^2$/g to about 4000 m$^2$/g, pore sizes from about 2.5 Å to about 300 nm, and aspect ratios of at least about 5.

32. The method of claim 31 wherein said activated carbon fibers have surface areas of from about 500 m$^2$/g to about 3000 m$^2$/g, pore sizes from about 5 Å to about 200 nm, and aspect ratios of from about 10 to about 2000.

33. The method of claim 32 wherein said activated carbon fibers have surface areas of from about 1200 m$^2$/g to about 2000 m$^2$/g, pore sizes from about 10 Å nm to about 100 nm, and aspect ratios of from about 10 to about 500.

34. The method of claim 28 wherein said activated carbon fibers have a mass of from about 62 g to about 124 g.

35. The method of claim 28 wherein said filter comprises activated carbon fibers having different mean diameters.

36. The method of claim 28 wherein said filter comprises a mixture of activated carbon fibers and non-carbonaceous materials.

* * * * *